Karl Meier
INVENTOR.

BY

Karl F. Ross
Attorney

United States Patent Office 3,489,031
Patented Jan. 13, 1970

3,489,031
COVER FOR AUTOMOBILE STEERING WHEELS, TENNIS RACKETS AND THE LIKE
Karl Meier, Wolfsburg, Germany, assignor to Kamei—Auto-Komfort—Wolfsburg K. Meier KG., Wolfsburg, Germany, a corporation of Germany
Filed Nov. 21, 1967, Ser. No. 684,686
Claims priority, application Germany, Nov. 24, 1966, K 60,781
Int. Cl. G05g 1/10; B62d 1/04
U.S. Cl. 74—558                                    7 Claims

ABSTRACT OF THE DISCLOSURE

A cover for handgrips of tennis rackets and other manipulatable articles having a foam-rubber or other cellular core of porous resilient foamed material within a gas interpenetratable skin provided with a multiplicity of throughgoing perforations and tied to the handle, steering wheel or other grippable member, the cover being provided with pockets or channels communicating with or interconnecting the perforations to facilitate aeration of the contact surface of the cover with the hand of the user; the channels are provided with a length greater than a hand's breadth.

---

My present invention relates to a cover for manipulatable articles such as the steering wheel of an automotive vehicle, a golf-club or tennis-racket handle, or other member adaptable to be grasped by the user's hand.

In commonly assigned U.S. Patent No. 3,312,124 issued Apr. 4, 1967 to me and another, there is described and claimed a steering wheel assembly for an automotive vehicle in which the steering-wheel crown is covered by a U-section band tied to the crown by a helically wound cord of generally flattened elliptical cross-section. The cover consists of a band having a cord of porous foamed material and a pair of nonporous surface skins of the same material unitarily connected with the core and sandwiching the core between them. The band is provided with a multiplicity of throughgoing perforations which extend substantially to the crown and which facilitate aeration of the hand-engaging surface of the cover. A cover arrangement of this character has the advantage that the air trapped in the resilient cellular core is pressed out upon gripping of the cover by the user's hand and upon release draws fresh air into the interior of the porous synthetic-resin layer. In this system, where the position of the hand on the surface of the cover constantly changes during normal operation of the vehicle and in carrying out the ordinary steering movements, a certain aeration of the hand surface occurs as so that blood circulation is not impeded, adhesion of the hand to the cover is prevented and the thermal welding of the thermoplastic mass is prevented. However, during long periods of travel along relatively straight roads, the movements of the hand are minimum and aeration is precluded. Occasionally, blood circulation may be restricted. In addition, such covers cannot be used effectively on the hand grips or handles of tools, tennis rackets, gold clubs and other sporting equipments or other members which are retained for long periods in the grasp of the user.

It is, therefore, the principal object of the present invention to provide an improved cover for manipulatable or hand-engageable members, especially vehicle steering wheels, tennis rackets, golf clubs and the like, wherein the aforementioned disadvantages can be avoided and an improved aeration of the hand-engaging surface insured.

This object and others which will become apparent hereinafter are attained, in accordance with the present invention, by providing a cover whose construction may correspond generally to that described in the aforementioned patent but which is provided in the region of the perforations with a number of channels along the upper surface of the cover in the region of its engagement with the hand of the user, these channels being of an extent exceeding a hand's breadth. Thus, according to a specific feature of this invention, each of the perforations may be formed on a protuberance above a pocket of the cover whereby the channels are formed between the protuberances or else longitudinal ridges provided connecting aligned protuberances and defining between the ridges respective troughs which constitute the channels.

Below the engagement surface of the cover, therefore, the foamed or cellular layer may be formed individual pockets communicating with and individual to the perforations by pressing the protuberances from the generally flap layer. Alternatively, common channels may extend longitudinally along the inner surface of the cover in communication with respective sets of such perforations and advantageously, the perforations along a common line. According to a further feature of this invention, the cover, which may be used with any manipulatable member, especially a steering-wheel crown, a tennis racket or a tool handle, is provided with an outwardly bulging protuberance at each of its perforations. The cover may have a resilient cellular or foamed and porous inner layer and an outer, gas-impermeable skin which may be formed during the normal foaming process at which the band is made. Thus, if the foamed band is a polyvinyl chloride or other thermoplastic foam, the imperforate but fluid-impenetrable surface skin can be produced by calendering the foamed band at a temperature in the region of the softening point thereof without completely compressing the band. This process forms a relatively tough skin. As pointed out in the aforementioned patent, a similar skin can be provided on the underside of the cover.

The above and other objects, features and advantages of the present invention will become more readily apparent from the following description, reference being made to the accompanying drawing in which.

Figure 1:
FIGS. 1, 2 and 3 are cross-sectional views through cover bands according to several embodiments of this invention.

In FIG. 1, I show an arrangement in which a fluid-impenetrable layer 1 is molded integrally with the pockets 1' communicating with the perforations 4 which are spaced along the cover. It will be understood that, wherever "pockets" are referred to here, these pockets can be individual to the perforations 4 or can be corrugations, ridges or troughs linearly formed in the cover as represented at 6 in FIG. 5. Individual pockets are shown at 5 in FIG. 4. The inner surface of the cover band 1 thus has channels 1'' running between the corrugations, the channels extending generally over a distance C (FIG. 4) greater than the breadth of a normal hand, i.e., greater than a linear distance of about 12–15 cm. At the longitudinal end, the band 1 is beveled along edges 1a and 1b to facilitate wrapping of the band tightly around the body. The pockets 1' are exposed while the protuberances 1c are enclosed by the wrapping operation (see FIG. 6). The band 1 contains no foamed core and is simply a foil of thermoplastic material and is entirely fluid-impenetrable.

Figure 2:
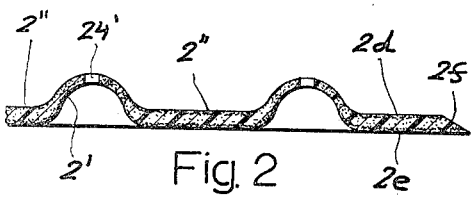

In the embodiment of FIG. 2, the longitudinally extending channels 2' or pockets individual to the perforations 24' are molded by pressing the inner and outer fluid-impenetrable skin 2d and 2e, which enclose the cellular core 2f, together at a temperature in the region of the softening point of the synthetic resin. The band 2 is here constituted with the foamed core whose inner and outer skins are produced during the foaming process as described in the aforementioned patent. Rows of perforations 24 are disposed along the channels 2'. Here again, channels 2" are formed along the inner surface between the troughs 2' and are exposed as illustrated at 6 in FIG. 5.

Figure 3:
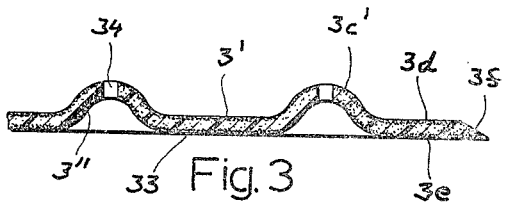

In the modification of FIG. 3, the band 3 has inner and outer integrally formed skins 3d and 3e sandwiching the cellular core layer 3f between them. Here again, either pockets 3" or longitudinally extending troughs 3' can be provided in the cover. The perforations 34 are longitudinally spaced along the channels or troughs 3' which are exposed as at 6 in FIG. 5 while the individual pockets 3" resemble the pockets 5 at FIG. 4. Along the inner surface of the cover, channels 3" of the indicated length are provided between the ridges 3c and the protuberances 3c'.

Figure 4:
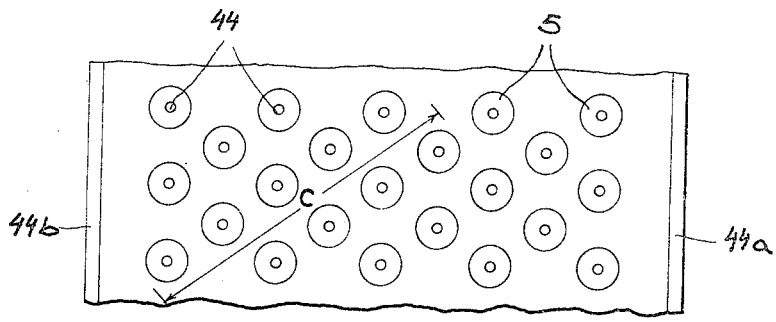
FIG. 4 is a plan view of a cover prior to its application to a manipulatable member.
Figure 5:
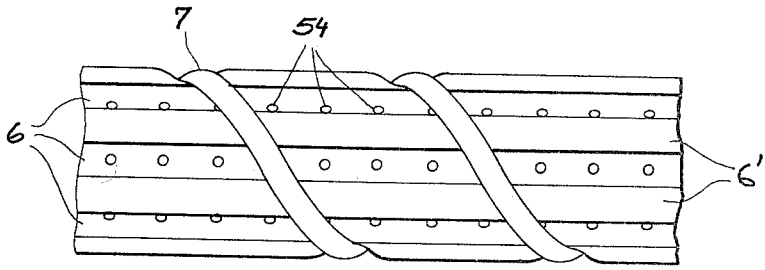
FIG. 5 is an elongational view of another cover upon its application to a cylindrical handle.

The upper surface of the band formed with pockets 6 is shown in FIG. 4 in which the pockets are designated at 5 and the perforations indicated at 44. The edges 44a and 44b of the band are beveled to permit wrapping of the band around the steering wheel or a tennis racket or the handle of a tool by a tie cord as indicated at 7 or 7' in FIGS. 5 and 6. When the perforations 54 are aligned along the trough 6, as shown in FIG. 5, the troughs 6 are separated by corrugations 6' which correspond to the regions 33 in FIG. 3. Here the troughs 6 run linearly the full length of the handle.

Figure 6:
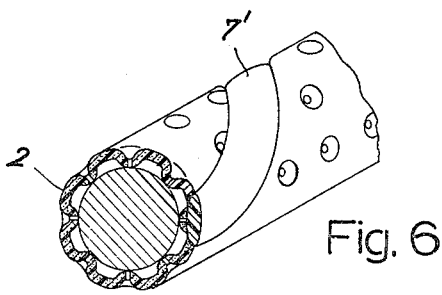
FIG. 6 is a cross-sectional view showing the cover of FIG. 4 applied to a vehicle steering wheel.

In FIG. 6, I show the tie cord 7' helically wound about a pocketed band as indicated at 2 in FIG. 2, the inner and outer skin being shown at 2d and 2e. The manipulatable object is a steering-wheel crown 10. In all of the embodiments, the pockets or troughs 5, 6 are normally filled with air and, when gripped by the hand, serve to drive air into the contact interface as the protuberances are pressed inwardly. This aeration is promoted in the system of FIG. 3 by the compression of the inner core. Since the material is elastomeric, release of the grip permits the deformed cover to reattain its original shape and refill the pores and the chambers with air. The channels permit air to pass to the underside of the hand even when it firmly grips the member.

I claim:
1. A cover for a vehicular steering wheel, comprising a fluid-impenetrable resilient layer wrapped around a hand-grippable portion of said vehicular steering wheel, said layer being formed with a plurality of outwardly bulging portions each defining a respective pocket open in the direction of the steering wheel, and with a multiplicity of throughgoing perforations including at least one perforation in each bulge communicating directly with the pockets thereof.

2. A cover as defined in claim 1 wherein said pockets are individual to respective perforations.

3. A cover is defined in claim 1 wherein said bulges extend longitudinally and said pockets are longitudinally extending through each communicating with a respective row of said perforations.

4. A cover as defined in claim 1 wherein said bulges form channels extending along said layer through a distance of at least a hand's breadth.

5. A cover as defined in claim 1 wherein said layer is a band embracing said member, said cover further comprising a tie cord helically wound around said band and securing it to said member.

6. A cover as defined in claim 5 wherein said layer is formed with an outer fluid-impenertable skin and a foamed porous core unitarily formed integrally with said skin.

7. A cover as defined in claim 6 wherein said core is sandwiched between a pair of said fluid-impenetrable skins and said skins are fused together at said bulges.

References Cited

UNITED STATES PATENTS

| | | | |
|---|---|---|---|
| 2,155,488 | 4/1939 | Hendrie | 74—552 |
| 2,855,021 | 10/1958 | Hoppe | 264—45 XR |
| 3,016,763 | 1/1962 | Albert | 74—551.9 |
| 3,189,069 | 6/1965 | Stowell | 75—551.9 XR |
| 3,312,124 | 4/1967 | Meier et al. | 74—558 |
| 3,344,684 | 10/1967 | Steere et al. | |

FOREIGN PATENTS

| | | |
|---|---|---|
| 206,527 | 10/1923 | Great Britain. |
| 330,243 | 6/1930 | Great Britain. |
| 465,270 | 5/1937 | Great Britain. |

FRED C. MATTERN, JR., Primary Examiner

F. D. SHOEMAKER, Assistant Examiner